P. D. BREWSTER.
COLOR NEGATIVE FILM.
APPLICATION FILED AUG. 10, 1914.
1,258,087.
Patented Mar. 5, 1918.
2 SHEETS—SHEET 1.
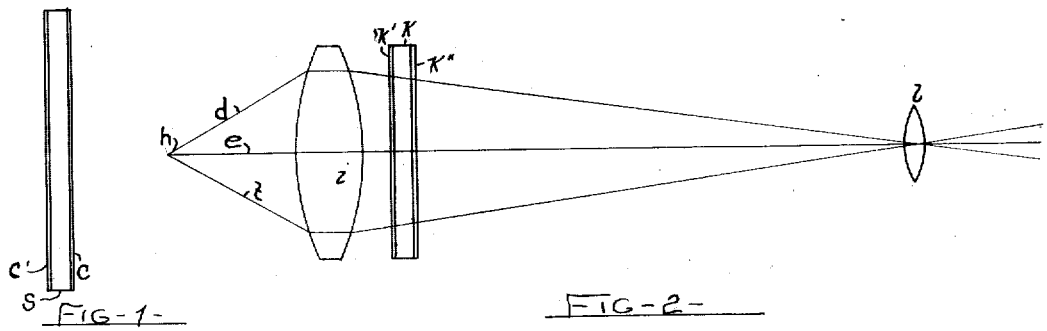
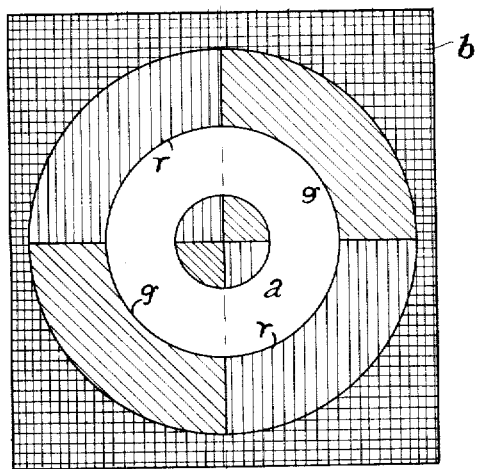
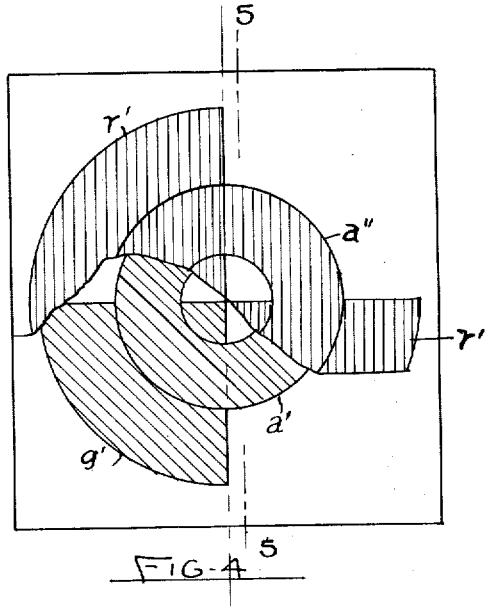
WITNESS
J. A. Dunham
INVENTOR
P. D. Brewster
BY
Kerr, Page, Cooper & Hayward
his ATTORNEYS P. D. BREWSTER.
COLOR NEGATIVE FILM.
APPLICATION FILED AUG. 10, 1914.
1,258,087.
Patented Mar. 5, 1918.
2 SHEETS—SHEET 2.
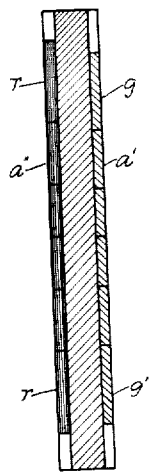
FIG.-5-
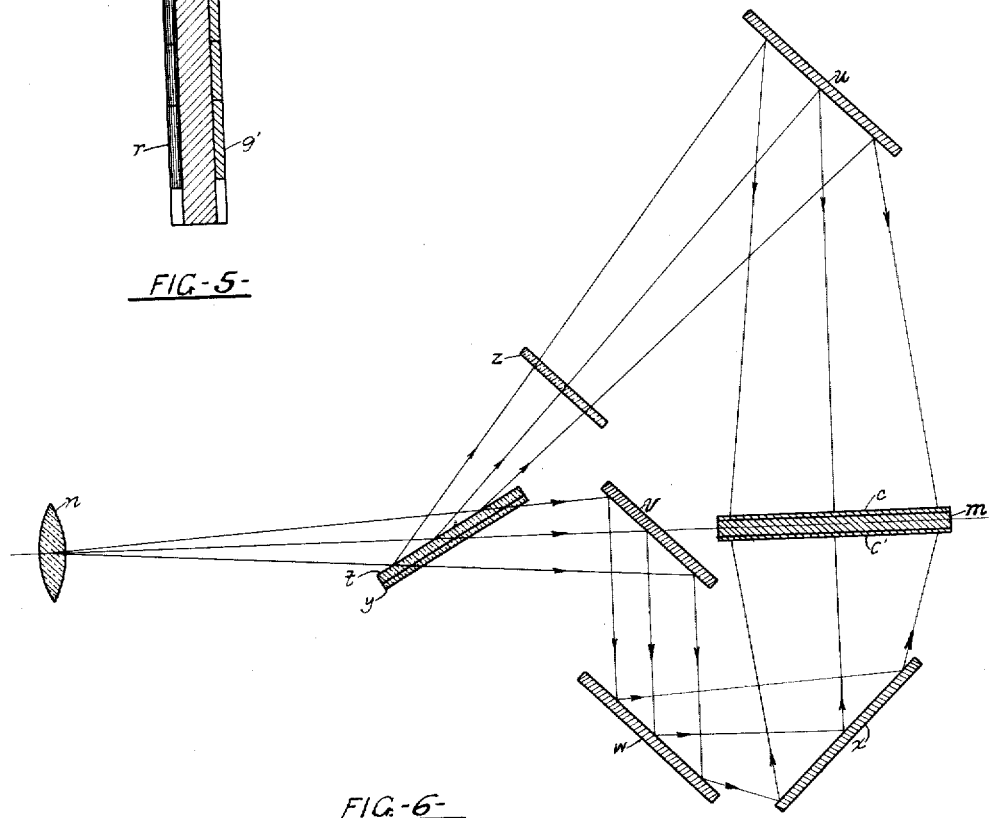
FIG.-6-
WITNESSES:
INVENTOR
P. D. Brewster
BY
Kerr, Page, Cooper & Hayward
his ATTORNEYS

UNITED STATES PATENT OFFICE.

PERCY D. BREWSTER, OF EAST ORANGE, NEW JERSEY.

COLOR-NEGATIVE FILM.

1,258,087.  Specification of Letters Patent.  Patented Mar. 5, 1918.

Application filed August 10, 1914. Serial No. 855,943.

*To all whom it may concern:*

Be it known that I, PERCY D. BREWSTER, a citizen of the United States, residing at East Orange, county of Essex, and State of New Jersey, have invented certain new and useful Improvements in Color-Negative Films, of which the following is a full, clear, and exact description.

This invention relates to color-photography, particularly color-cinematography, and its chief object is to provide a color-negative from which color-positives can be printed. To this and other ends the invention consists in the novel features hereinafter described.

Referring to the annexed drawings for a detailed description of my improved negative and its method of production and subsequent use, Figure 1 is an edgewise view of the "raw stock" from which the negative is made.

Fig. 2 is a diagram illustrating the projection of a positive by means of a projecting system employing a condensing lens or condenser.

Fig. 3 is a front view of a simple object to be photographed in colors, the crossed lines representing black, the vertical lines red, and the diagonal lines green.

Fig. 4 is a front view of a colored negative embodying the present invention in its preferred form.

Fig. 5 is a sectional view of the negative on line 5—5 of Fig. 4, exaggerated in thickness.

Fig. 6 is a diagram of a camera suitable for exposing the film.

In my copending application Ser. No. 747,712, filed February 11th, 1913, I have described in detail a method of producing color-negatives, of the general type described herein, in which the film stock is coated with sensitive emulsions on both sides, the coating on one side being substantially transparent. The transparent coating is sensitive chiefly to light of one group of colors say the spectral group between green and violet, inclusive, while the other is sensitized primarily for the colors below yellow green in the spectrum. A film of the double coated type is illustrated in Fig. 1, in which $s$ designates the transparent celluloid base or support, $c$ the transparent green-sensitive emulsion, $c'$ the red-sensitive emulsion. In using this film in a camera the transparent coating $c$ is turned toward the lens, so that the rays from the latter not only impinge on the coating $c$ but also pass through the same and the transparent base or support $s$ and strike the emulsion $c$ which, it will be remembered, is sensitive to a different group of colors.

Being thus exposed the film has on one side a "latent" image produced by rays to which the emulsion $c$ is sensitive and on the other a "latent" image produced by rays to which the emulsion $c'$ is sensitive. Development and fixation then produces black and white negative images, one on each side, in varying degrees of density of silver deposit according to the amount of light that acted on the respective sides. The two images are now stained in different colors, say green on the side $c$ and red on the side $c'$. The negative is then complete, and can be used for printing positives as hereinafter described. The staining or coloring of the negative images can be effected in any suitable way, as for example by the well known Traube process. In this process the silver of the images is converted into silver iodid, which is capable of acting as a mordant for basic and cosin anilin dyes. The two sides of the film are then treated with dyes of the desired colors and, if desired, the silver is dissolved out by potassium cyanid or by a strong solution of sodium thiosulfate ("hypo") containing tannin and sodium acetate.

Instead of using the film as a negative from which to print positives it may, before coloring, be converted into a positive by "reversal" after which the positive images are colored, producing a positive in colors. This positive can be used for projection, and from it negatives can be printed. The latter can then be converted into color-positives by coloring or reversal and coloring.

In Fig. 2 I have illustrated diagrammatically a projecting apparatus, for projecting images on a screen, in which rays of light, as $d$, $e$, $f$, from a source of light at the point $h$ are collected by a "condenser" $i$ and caused to converge through the color-positive $k$ to the projecting lens $l$. From this figure it will be clear that the two positive images on the two sides of the positive film should not be exactly superposed all over, for the reason that the rays from the condenser are not parallel but are convergent. Hence the point at which the non-axial ray $d$, for example, passes through the coating or image $k'$ is not perpendicularly in rear of the point at which the same ray passes through the front coating or image $k''$. Accordingly the two images would not coincide on the screen, and imperfect "definition" or "fringing" would result. I therefore prefer to have the two images exactly superposed or congruent at the center, but one progressively larger than the other to compensate, as it were, for the angularity of the non-axial or extra-axial rays used in projection. Hence I prefer to have the images on the negative differ in the same way, so that the positives can be printed by contact with parallel rays. This desirable difference in size of the two negative images can be produced with a camera of the ordinary type by using an exposure lens which will give the same "angularity" to the non-axial rays as the projecting rays have in the subsequent projection of the positives. In other words, I use in the camera an exposure lens having substantially the same focal length as that of the projecting system by which the positives are to be exhibited. This condition will be readily understood from Fig. 2 by imagining the lens $l$ to be the exposure lens of the camera, the film $k$—$k'$—$k''$ the film to be exposed, and the condenser $i$ omitted.

To explain more fully the nature of the negative having images which are centrally congruent but progressively different in size toward the margins, reference is made to Figs. 3, 4 and 5. In Fig. 3 is shown a colored object to be photographed, consisting of a white ring or annular figure $a$, a circular field composed of red quadrants $r$ and green quadrants $g$, and a black background $b$. The resulting negative arranged with the larger image toward the observer, is shown in Fig. 4, with part of the emulsion or coating, on the side nearest to the observer, broken away to show the image on the underside. To avoid confusing the figure I have not attempted to make the image on the back or underside appear through the transparent film or support. The larger image being shown as red, and on the front, the smaller image is green, and is on the back. Since the white ring $a$ reflects both green and red light there is an annular image on each side of the film,—a green image $a'$ on the back and a red image $a''$ of larger size on the front, as shown also in the sectional view Fig. 5, taken on line 5—5 of Fig. 4. The front image of the circular field is composed of two red quadrants $r'$, $r'$, and the back image is composed of two smaller quadrants in green, one of which is shown at $g'$. The black background $b$ is assumed to have reflected no light, or to have reflected too little to affect either emulsion.

Since the two images are made or produced by light of different colors, for example red and green, it will be clear that neither is, in general, a complete image of the object. Thus in Fig. 4 the larger image $r'$—$a''$—$r'$ does not represent completely the object shown in Fig. 3, since it lacks the image of quadrants $g$, $g$. For a like reason the smaller image on the other side is defective. But the two together form a complete image of the object, and they can accordingly be described as being "complementary"; though it should be understood that the term does not refer to colors.

If negatives are desired in which the images are exactly superposed or congruent throughout they can be produced by means of a camera of the type described in my copending application Ser. No. 815,153, filed January 29th, 1914. A camera of this type is illustrated (with the customary light-tight box and other appurtenances omitted) in Fig. 6 of the accompanying drawings. In this figure, the film $m$, having emulsions $c$, $c'$ on its opposite sides, is arranged in the plane of the axis of the lens $n$. Between the lens and the film is a transparent reflector $t$ which reflects part of the light to a reflector $u$ which in turn reflects this part of the light to the emulsion $c$. The reflector $t$ also transmits part of the light, which is reflected by the reflectors $v$, $w$, $x$ to the emulsion $c'$. With such a type of camera both emulsions or coatings can be opaque. Moreover, one or both can be "panchromatic," that is, more or less sensitive to all colors, in which case the undesired rays can be cut out by means of ray-filters. Thus a red filter $y$ may be placed on the back of the transparent reflector $t$ to absorb or cut off green rays and those above green, and a green filter $z$ may be placed in the path of the light reflected from $t$ to absorb or cut off rays below green.

The negatives made by the process described in my application Serial No. 747,712 or with the camera shown in Fig. 6 herein are taken from the same point of view (through the same lens) and hence are non-stereoscopic. This is an important feature in many cases, since, as is well known, stereoscopic images are necessarily different in contour and "drawing". For this reason positives made from stereoscopic negative images cannot be in suitable registry for projection so as to produce a single image on the screen, as is desired in the present invention. By the terms "suitable registry" and the like in the appended claims I mean that the images are so arranged with respect to top and bottom and right and left that positives can be printed therefrom suitable for the projection of a unitary image on a screen. The two images being made by simultaneous exposures, a moving object is represented in the same position in both images.

From the foregoing description it will be clear that the images on the completed negative can be in silver on both sides, in dye or color on one or both sides, or in silver or silver salts on one or both sides. Moreover, they can be of the same size and congruent or superposed throughout, or they may be progressively different in size from the center to the margins. Nor is it essential that the two images be colored in correspondence with the colors of the rays by which they were produced. This would mean that a negative image produced by green light would have to be colored green, and that one produced by red light would have to be colored red. On the contrary, any other two colors can be used, or the two mentioned can be exchanged, it being only necessary that the two used be sufficiently separated in the spectrum to prevent either from acting to a material extent on both sides of the positive film in printing.

Since the positives which can be produced from the negatives form no part of the present invention I deem it unnecessary to describe the same or their production in detail. Suffice it to say that positives (on film coated on both sides) can be printed by contact or by projection (as in making ordinary lantern slides by "enlargement" or "reduction"), after which they can be developed and fixed and the images colored in two different colors, as for example one green and the other red.

It is to be understood negatives embodying the present invention can be produced by other processes and apparatus than those herein specifically described.

I claim:

1. A photographic negative for the purpose described, comprising a base or support having images, complementary as to color values, of the same object on its two sides in suitable registry with each other.

2. A photographic negative for the purpose described, comprising a transparent base or support having on its two sides suitably registered images, complementary as to color values, of the same object.

3. A photographic negative for the purpose described, comprising a base or support bearing suitably registered, non-stereoscopic images, complementary as to color values, representing the same object in the same position.

4. A photographic negative for the purpose described, comprising a transparent base or support having on one side a colored image of an object and on the other side a differently colored image of the same object in the same position, the two images being complementary and non-stereoscopic and in suitable registry.

5. A photographic negative for the purpose described, comprising a flexible support or base having on its two sides suitably registered negative images, complementary as to color values, of an object in the same position, the two images being taken from the same point of view.

6. A photographic negative for the purpose described, comprising a base or support having on one side an image of an object and on the other side an image of the same object in the same position, the two images being complementary and in suitable registry and one being slightly larger than the other.

7. A photographic negative for the purpose described, comprising a base or support having on both sides images of the same object, the two images being complementary and in suitable registry and congruent at one point but one image being slightly larger than the other.

8. A photographic negative for the purpose described, comprising a base or support having on one side an image produced by light of one color or groups of colors and on the other side and in suitable registry with the first an image of the same object produced by light of a different color or group, the two images being centrally congruent but different in size.

9. A photographic negative for the purpose described, comprising a base or support having two differently colored images of the same object in the same position, taken from the same point of view and suitably registered with each other, one taken by light of one color or group of colors and the other by light of another color or group.

10. A photographic negative for the purpose described, comprising a base or support bearing two negative images of the same object, in suitable registry with each other, one image taken by light of one color or group of colors and the other by light of another color or group, and both taken simultaneously from the same point of view.

11. A photographic negative for the purpose described, comprising a base or support having on one side and in one color an image of an object taken by light of one color or group of colors and on the other side and in another color a slightly larger image of the same object taken simultaneously with the first and suitably registered therewith.

In testimony whereof I affix my signature in the presence of two subscribing witnesses.

PERCY D. BREWSTER.

Witnesses:
M. LAWSON DYER,
THOMAS J. BYRNE.